Fig. 1a

Commercial sulfite
softwood pulp

Fig. 1b

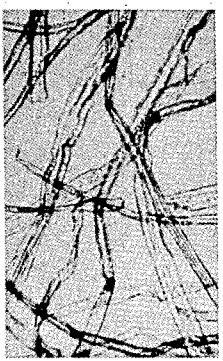

Prehydrolysis sulfate soft-
wood pulp, with no concen-
trated caustic extraction

Fig. 1c

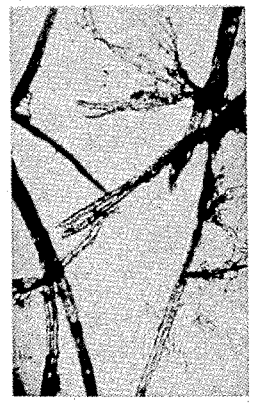

Prehydrolysis sulfate soft-
wood pulp with 7% NaOH
solution extraction

Fig. 1d

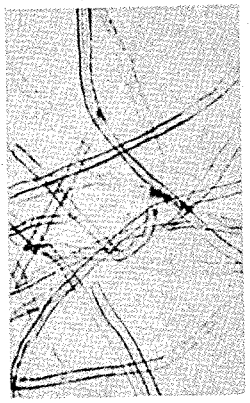

Prehydrolysis sulfate softwood
pulp, with 6% NaOH solution
extraction

Fig. 1e

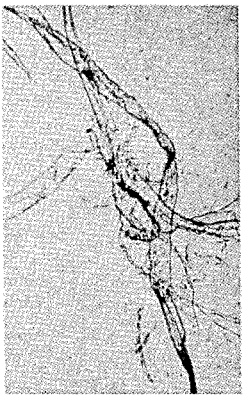

Prehydrolysis sulfate softwood
pulp with 7% NaOH solution
extraction

Inventors
Linwood N. Rogers
Merle A. Heath
Earl W. Gutliph
Louis A. Hiett,
By Watson, Cole, Grindle & Watson Attorneys

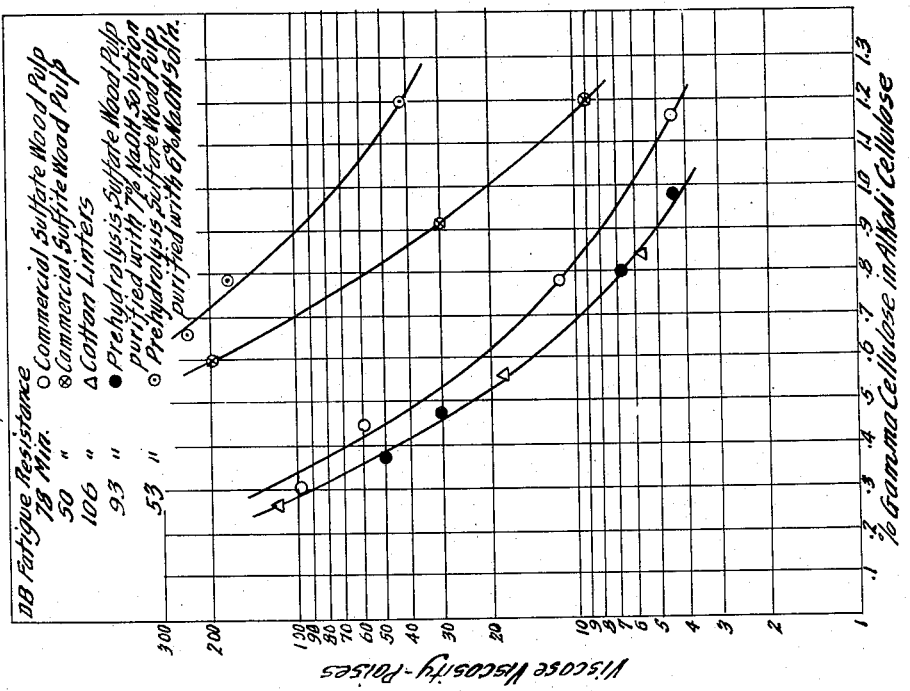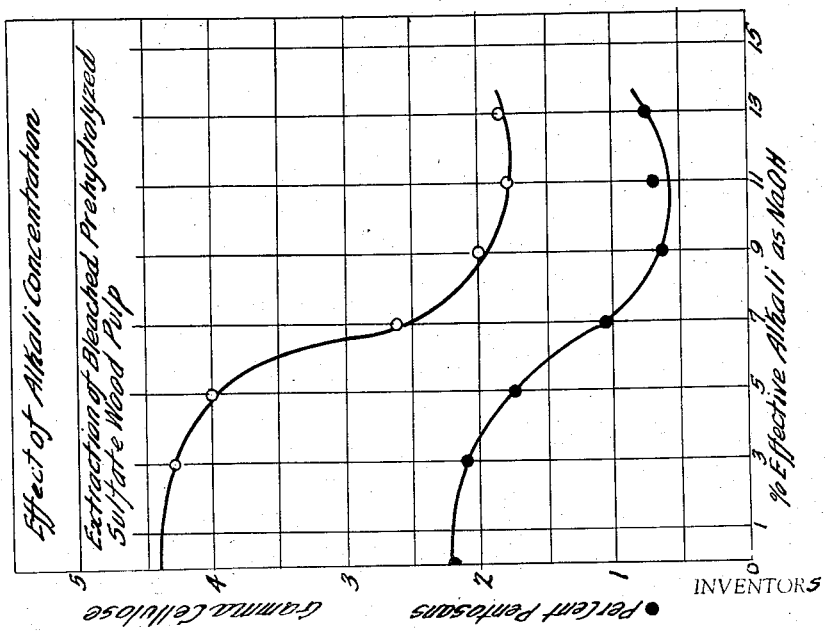

Fig. 2a

Commercial sulfite softwood pulp

Fig. 2b

Prehydrolysis sulfate softwood pulp, with no conc. caustic extraction

Fig. 2c

Prehydrolysis sulfate softwood pulp, with 7% NaOH solution extraction

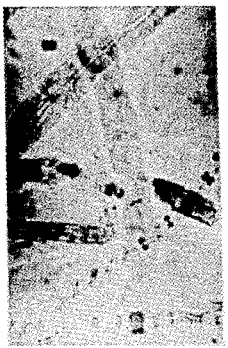

Fig. 2d

Prehydrolysis sulfate softwood pulp, with 6% NaOH solution extraction

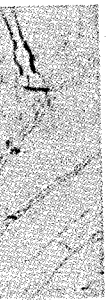

Fig. 2e

Prehydrolysis sulfate softwood pulp, with 7% NaOH solution extraction

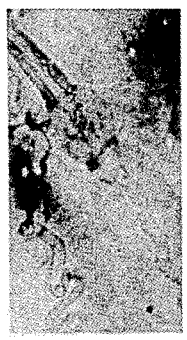

Fig. 3a

Prehydrolysis sulfate softwood pulp, without conc. caustic extraction

Fig. 3b

Prehydrolysis sulfate softwood pulp, extracted with 7% NaOH solution

2,878,118
PURIFIED CELLULOSE FIBER AND PROCESS FOR PRODUCING SAME

Linwood N. Rogers, Merle A. Heath, Earl W. Gutliph, and Louis A. Hiett, Memphis, Tenn., assignors, by mesne assignments, to The Buckeye Cellulose Corporation, Cincinnati, Ohio, a corporation of Ohio Application February 18, 1953, Serial No. 337,628

3 Claims. (Cl. 92—16)

This invention relates to the production of cellulose fiber from ligno-cellulosic materials.

More specifically this invention relates to the production of a cellulose fiber having a high degree of purity and characteristics which make it highly suitable for use in the manufacture of cellulose derivatives, and particularly rayon yarn for applications requiring high tenacity and resistance to fatigue.

The primary object of this invention is to provide a process for the liberation and purification of cellulose from wood and other ligno-cellulosic materials whereby a chemical disintegration of the cellulosic material into its component fibrils is initiated, promoting the removal of non-cellulosic constituents and resulting in a pulp having a uniform and high reactivity when contacted with chemical treating agents for conversion into various cellulose derivatives.

Another object of this invention is the provision of a process for the liberation and purification of cellulose from ligno-cellulosic materials to render the cellulose suitable for the production of cellulose derivatives.

Still another object of this invention is the provision of a process for the liberation and purification of cellulose from wood whereby the cellulose is rendered highly suitable for the production of high tenacity viscose rayon having extraordinary resistance to fatigue.

Other objects will appear from the following detailed description.

In the past, many processes have been described for the manufacture, from wood or other ligno-cellulosic materials, of cellulose suitable for conversion into viscose rayon and various other derivatives. Cellulose of this type must of necessity be of a high degree of purity and it is generally desired that the product have a high alpha cellulose and a low pentosan and beta and gamma cellulose content. In prior and present day practice, normally the entire burden of purifying the cellulose liberated from the raw ligno-cellulosic material falls upon only a few processing steps which, in order to achieve the necessary purity in the product, are necessarily drastic in character; or where mild in character result in a sacrifice in product purity.

In a number of industrial applications for viscose rayon yarn, such as, for example, in the manufacture of automobile tires, airplane tires and power transmission and conveyor belts, resistance of the rayon yarn to fatigue failure is highly important.

For an automobile tire, for example, to give good service, it is important that the tire cords have the ability to withstand continuous flexing and shock over a wide range of temperature. Otherwise weak spots in the tire wall might develop which would eventually lead to a tire failure or blowout. Heretofore, in the manufacture of viscose rayon for tire cord, laboratory tests and actual experience in service have shown that the best fatigue resistance was obtained by the use of purified cotton linters in the viscose manufacture. As a source of chemical cellulose, however, cotton linters has the inherent disadvantage of being an annual crop which is a byproduct of the cotton fiber and cottonseed oil industries; and therefore the supply of cotton linters suitable and available for purification is not only limited in amount but may fluctuate widely (e. g., between about 400,000 and 800,000 bales per year). As a result its cost to the tire cord manufacturer has amounted on occasion to two or three times that of chemical woodpulp, varying for example from $160 to over $500 per ton. In view of this, it would be highly desirable to have a broader and more stable source of supply, such as could be provided by wood pulp. But, it has not been possible up to now to use wood pulp as the starting material for viscose tire cord, since such cord has had distinctly inferior fatigue resistance and has proven unsatisfactory except when blended with purified cotton linters.

Compared to commercially available viscose grade wood pulps, purified cotton linters is characterized chemically by a higher proportion of the longer chain-length cellulose molecules (alpha cellulose fraction) and, consequently, a smaller proportion of short chain-length material (beta and gamma cellulose fractions), and by a smaller pentosan content. A comparison of the cellulose and pentosan fractions of a typical commercial cotton linters pulp and a viscose grade wood pulp suitable for tire cord manufacture is given in Table I.

TABLE I

| | Cotton Linters, percent | Wood Pulp, percent |
|---|---|---|
| Alpha Cellulose | 98.5 | 95.3 |
| Beta Cellulose | 1.0 | 1.6 |
| Gamma Cellulose | 0.5 | 3.2 |
| Pentosans | 0.2 | 1.4 |

We have found a process for producing a cellulose fiber from wood by means of a series of systematic and specific chemical treatments which has properties substantially as good as those exhibited by cotton linters and which has about the same cellulose and pentosan fractions. It is of particular note that the cellulose fiber produced by our process, when converted into viscose rayon tire cord, exhibits a resistance to fatigue closely approaching that of viscous rayon tire cord derived from cotton linters.

This process comprises an initial hydrolysis (referred to as prehydrolysis) of wood chips under acid conditions. This has been shown in the art to alter the chemical or physical structure so that a substantial part of the pentosans are removable by a subsequent alkaline cooking procedure. This prehydrolysis treatment is followed by an alkaline pulping step, using either a "sulfate" or "soda" process. The pulp obtained is then bleached by a multi-stage process, the material being washed with water between each stage. A two stage chlorination treatment is preferred followed by a hot alkaline extraction to remove the solubilized lignin and impurities. The pulp is then bleached with an alkaline hypochlorite solution and extracted at moderate temperature (about 68–120° F.) with a strong caustic solution. After the caustic extraction, another mild oxidizing bleach stage is employed, and finally an acid treatment with a dilute solution of a mineral acid. The acid is washed out of the pulp with soft water and the washed pulp is then dried, normally into the form of sheets.

As is well known in the art, upon resolution for the production of viscose rayon, dried cellulose sheets are placed in a press and steeped in a strong solution of caustic soda. This extracts certain impurities and short chain length cellulose constituents and changes the sheets into "alkali cellulose." After steeping, the cellulose sheets are squeezed by means of a hydraulic ram to reduce the caustic solution in contact with the alkali cellulose to a predetermined ratio. Then the damp sheets are removed from the press and torn into small particles in a shredding machine. These particles, which are called alkali cellulose crumbs, are then aged under carefully controlled conditions. Here, by means of alkaline oxidation, the average molecular chain length of cellulose is reduced so that the material will have a lower solution viscosity. After aging, the alkali cellulose crumbs are mechanically mixed with the proper proportions of carbon disulfide, which combines chemically to form cellulose xanthate. Upon adding dilute caustic soda solution in a mixer, the orange colored cellulose xanthate crumbs dissolve and form a syrupy solution which is known is viscose. The viscose solution is then ripened at controlled temperature. In this step, complex chemical and colloidal changes occur so that the cellulose xanthate is more easily converted back to cellulose in spinning. Spinning consists of extruding the liquid viscose solution through the minute holes of a spinneret into a bath containing acid and salts. The dissolved cellulose compound in the viscose reacts with the acid, regenerating cellulose, which precipitates and forms a continuous solid filament. The salts in the bath help to control the precipitation of the cellulose and modify the properties of the filament. The combined filaments from a single spinneret make up the yarn which is washed, treated chemically to remove residual sulfur, washed again, and dried. The filaments are twisted to give the yarn strength and unity.

Rayon yarn intended for use in tire cord must be high tenacity or high strength viscose rayon yarn and the strength of the yarn is increased by stretching the filaments during the spinning operation. Two strands or plies of yarn are then combined, with additional twisting, to produce the tire cord.

In the accompanying illustrations:

Figures 1a to 1e are photomicrographs, at a magnification of 100, of purified woodpulps obtained by different processing methods.

Figures 2a to 2e are photomicrographs, at a magnification of 100, of purified wood pulps obtained by different processing methods, when swollen with a dilute cupriethylenediamine solution.

Figures 3a to 3b are photomicrographs, at a magnification of 200, of purified wood pulps obtained by different processing methods, when swollen with a dilute cupriethylenediamine solution.

Figure 4 is a graphical representation showing the effect of the concentration of alkali in the extracting solution on the pentosan and beta and gamma cellulose content of the partially bleached prehydrolyzed sulfate wood pulp.

Figure 5 is a graphical representation of the increase in gamma cellulose content of various viscose solutions on aging, and also shows the correlation between the gamma cellulose and the fatigue resistance of the various pulps tested.

Broadly, our invention comprises the following sequence of operations:

(1) Wood chips, or other lignin-containing cellulosic material is treated with water, steam or dilute acid solution (up to 0.3% solution of acid), at 300° to 350° F. and at pressures greater than atmospheric, for from 30 minutes to 120 minutes. This treatment is carried out under acid conditions which may be induced by the addition of an acid such as, for example, acetic, citric, nitric, oxalic, phosphoric, sulfurous (sulfur dioxide), sulfuric or combinations of these. Alternatively, if it is desired that no acid shall be used, and providing no alkaline reagents have been added, an acid condition will develop as a result of the hydrolysis of the cellulosic material being heated.

At the end of this treatment period, any free liquid is drained off, and the remaining solid material may be washed in situ, or the cooking liquor for the next step may be added directly without washing.

(2) The hydrolyzed lignin-containing material is pulped by one of the usual alkaline pulping procedures. In the soda process, the active digesting agent is sodium hydroxide. In the sulfate process, the active digesting ingredients are sodium hydroxide and sodium sulfide. The sulfidity, that is, the percentage (by weight) of the sodium sulfide to the sum of sodium sulfide and sodium hydroxide, both chemicals being calculated as $Na_2O$, is commonly in the range of 20 to 30%. Total alkalinity of the chemicals in either pulping procedure, as $Na_2O$, should fall within 15 to 25% of the dry weight of material to be treated. The ratio of total solution to the material to be pulped may vary from 3.5:1 to 6:1. A minimum practical temperature of treatment is about 325° F. with a maximum temperature preferably in the range of 340 to 350° F. This maximum temperature may be reached in 1 to 2 hours and treatment at the maximum temperature may continue from 1.5 to 2.5 hours. After the digestion treatment, the mixture is blown from the digester to reduce the cellulosic material to a fibrous condition, and the treating liquor is removed by draining and washing. Large pieces and fiber bundles which have not been completely broken apart, are removed by a screening operation. Any reference to the "sulfate" method of digestion appearing herein or in the appended claims refers to digestion under the conditions set forth above using sodium hydroxide and sodium sulfide as the active digesting ingredients.

(3) The pulp is treated at a consistency below 4% but within the limits of good economical operation, with elemental chlorine at a pH between 1.75 and 2.5, and at a temperature from 68 to 86° F., for a period of from 15 to 60 minutes; sufficient usually to consume all the chlorine added and to allow for diffusion of water soluble products from the interior of the fibers. The amount of chlorine to be added must be judged on the basis of experience with the particular material which has been pulped and the amount of residual lignin and other non-cellulosic impurities which it contains. The low pH for the treatment cannot be obtained by the addition of chlorine alone and an acid, e. g. sulfuric or hydrochloric, is normally added to lower the pH to the desired value.

(4) After washing out the soluble impurities from the preceding treatment, a second similar treatment with elemental chlorine under the same conditions may be applied to the pulp. By carrying out the chlorine treatment in two parts, the concentration of chlorine in each treatment may be lower, and the additional mechanical handling and washing helps to remove the impurities more completely. The pulp is again thoroughly washed after this second chlorine treatment.

(5) The pulp is extracted with 1 to 5% alkali, based on the dry weight of the pulp, using as high a consistency as is practicable for efficient operation. Sodium hydroxide is the alkali normally used here but, if desired, sodium carbonate or a mixture of sodium hydroxide, sodium sulfide and sodium carbonate may also be used. An extraction in the range from 160 to 230° F. for 30 to 120 minutes is normally adequate to remove the alkaline soluble chlorine treated lignin and other impurities. The pulp is then washed well with water.

(6) In order to bleach the remaining colored impurities, the pulp is treated at 10 to 15% consistency and at a temperature of from 85° to 140° F., with a dilute sodium hypochlorite solution, having its alkalinity adjusted so as to maintain the pH at 8 or higher, a normal maximum pH being about 11 or 12. As is well known in the art, the pulp viscosity is lowered by the oxidizing conditions of this treatment, so that the amount of sodium hypochlorite used, the alkalinity, temperature, and time of treatment will be influenced by the ultimate pulp viscosity that is desired. The time of treatment will not normally exceed three hours. Following this bleach, the pulp is again washed.

(7) The bleached pulp is given a purification treatment at 10 to 15% consistency and at a temperature of from 68° to 120° F. using a solution containing at least about 7% effective alkali, calculated as sodium hydroxide, and sufficient to reduce the pentosan content of the pulp to less than about 1.5% and the combined beta and gamma cellulose content to less than about 4%. As a practical matter however, the alkali concentration does not normally exceed about 12%. Alkaline agents which find particular application in this purification step are sodium hydroxide and normal sulfate cooking liquor (sodium hydroxide, sodium sulfide and sodium carbonate). Potassium hydroxide may also be used but is undesirable from an economic standpoint.

The time of treatment is normally from one to two hours. After the extraction, the solution is removed by draining and washing, and when adjusted to the proper concentration may be further used for the pulping operation.

(8) A final sodium hypochlorite bleaching is given the purified pulp, using a low consistency in keeping with normal plant operation at this stage. We have found that a consistency in the neighborhood of 6% is desirable. The pH is adjusted to a value in the range from about 8 to 12 and the temperature is normally maintained between about 85 and 140° F. The amount of sodium hypochlorite added and the time of treatment will be determined by the final pulp viscosity desired. It is desirable to have the equipment for the treatment in this stage so arranged that additional chemicals may be added at at least one intermediate point during the treatment. Depending upon the purity of pulp desired, it is sometimes possible to eliminate this stage entirely. (Chlorine dioxide may, if desired, be substituted for the hypochlorite bleaching agent in this stage.)

(9) After washing, the bleached, purified, pulp is soaked at 4% consistency or less in a dilute solution of a mineral acid, e. g. sulfurous, sulfuric or hydrochloric acid, containing approximately 1% acid based on the dry weight of pulp, for from 15 to 60 minutes at from 68 to 86° F. Following this acid soaking, it is desirable to use only softened (sodium zeolite treated) or demineralized water for washing to avoid the absorption of heavy metal and alkaline earth metal salts.

It is our belief that the greatly enhanced resistance to fatigue of viscose tire cord derived from pulp produced in accordance with our process is primarily due to the modification of the physical structure of the cellulose fiber during processing. This modification, which is brought about by the particular sequence of processing steps set forth above, marks the initiation of an actual chemical disintegration of cellulose fibers into component fibrils, a disintegration which is completed, for example, during the process of preparing viscose from such pulp, and, for the sake of convenience, will hereinafter be referred to as chemical fibrillation. This chemical fibrillation in turn promotes a more complete purification of the pulp and the production of an ultimate pulp product which exhibits a greater reactivity when contacted with various agents for conversion into cellulose derivatives. This higher reactivity results in a more complete solution of viscose, for example, and consequently a tire cord yarn of superior characteristics.

The fibrillation of wood pulp has been accomplished heretofore only by mechanical means such as beater rolls or jordans. This means of obtaining fibrillation is, however, detrimental to the production of a dissolving pulp since hydration of the pulp takes place during the mechanical processing step and the result is a hard and horny cellulose fiber which is relatively unreactive.

In contrast, our process provides a sequence of processing steps which causes the fibers to swell and contract to such an extent that they actually fall apart without the benefit of mechanical aids and to the best of our knowledge no previous process for pulping wood has produced chemical fibrillation in the pulp fibers.

For the production of a highly purified cellulose it is essential that the fibrillation be accomplished before the purification of the pulp has been completed. Consequently, it is our intention that the pulp fibers be in such a weakened state that the fibrillation is completed in the strong, cold caustic extraction step (step #7 above). This enables further purification of the fibrillated pulp to take place in subsequent treating steps.

The series of photomicrographs in Figures 1, 2, and 3 quite clearly show the chemical fibrillation obtained when our process is utilized in the production of a dissolving pulp from wood.

Figures 1a to 1e are photomicrographs (magnification 100 ×) of a number of viscose grade bleached wood pulp fibers for use in the production of tire cord. 1a is a sample from a commercial sulfite softwood pulp, the fibers showing considerable bending and curling, which has been described in the literature as characteristic of highly purified fibers. (Wilhelm Kilpper, The Bending Factor of Different Paper Pulps. Das Papier 1, No. 9/10, 173–82; No. 11/12, 218–22 (November, December, 1947) 2; No. 3/4, 58–63; No. 13/14, 228–37 (February, July 1948).) The remaining photomicrographs, 1b to 1e are of sulfate softwood pulp prepared according to the sequence of treating steps set forth herein but with variations in the caustic extraction step of the purification procedure. 1b represents a sample which did not have a concentrated caustic extraction whereas 1d was extracted with approximately 6% NaOH solution. There is little difference between the two samples, and in both cases the fibers are relatively intact. 1c and 1e represent two different charges of slash pine pulp which were extracted with more concentrated alkali, 7% NaOH solution. 1c was given a double chlorination whereas 1e had only a single chloration. Here it may be seen that the fiber walls have been attacked and that the fibers show a great deal of disintegration, splitting and fibrillation. This breaking up on chemical fibrillation of the fibers, when measured by separating the material into fractions according to size, shows a definite correlation with the fatigue resistance of the viscose tire cord produced from the pulps. This may be seen in Table II below.

All values relating to the fatigue resistance of tire cords (DB fatigue) appearing in Table II below, and elsewhere herein, were determined on a fatigue tester such as described by Roseveare and Waller in "A Dynamically Balanced Fatigue Tester for Rayon Tire Cord," Textile Research Journal 19, 633–37, October 1949 (hereinafter referred to as the DB tester), and are based on a value of 100 minutes for the fatigue resistance of tire cord derived from purified cotton linters.

TABLE II

| Sample (Figure 1) | a | b | d | c | e | Cotton Linters |
|---|---|---|---|---|---|---|
| DB fatigue of tire cord, Mins | 48 | 31 | 41 | 90 | 74 | 100 |
| Fraction of fibers on 40 mesh | 81.6 | 90.3 | 91.4 | 64.0 | 70.1 | 64.7 |
| Through 40, on 60 mesh | 4.9 | 4.8 | 4.3 | 17.1 | 14.0 | 16.7 |
| Through 60, on 100 mesh | 4.0 | 2.1 | 1.7 | 7.2 | 5.7 | 7.4 |
| Through 100, on 200 mesh | 4.1 | 1.0 | 1.2 | 5.6 | 4.4 | 4.1 |
| Through 200, on 300 mesh | 0.6 | 0.1 | 0 | 0.9 | 0.6 | 0.1 |
| Through 300 mesh (by difference) | 4.8 | 1.7 | 1.4 | 5.2 | 5.2 | 7.0 |

Figures 2a to 2e are photomicrographs (magnification 100×) of different purified wood pulp fibers when they are swollen with a dilute (0.18 molar) cupriethylene diamine solution. (If desired, other swelling agents such as a cuprammonium or caustic soda solution may be used in place of the cupriethylenediamine solution.) The fiber walls consist of three parts: primary wall, secondary wall, and inner part of the secondary wall which some authors call the tertiary wall. It directly surrounds the inner canal or lumen of the fiber. In the primary and inner part of the secondary wall (or the tertiary wall) the fibers are wound nearly transversely around the fiber axis, but in the main part of the secondary wall they are more nearly parallel to the longitudinal axis. In its original state, the primary wall forms a continuous sheath which does not swell or swells only slightly in the cupriethylenediamine solution. In the central portion of photomicrograph 2a a fiber is seen, in which the outer sheath is almost entirely intact and the fiber has not swollen. But if the outer wall is broken at any spot the swelling secondary wall pushes through, extending the break of the primary wall and pushing or rolling it back so that it eventually becomes a narrow constriction between ballooning portions of the swollen secondary wall. Such a fiber is visible in the extreme upper right corner of 2a. If the outer wall is largely removed the fiber can swell readily with only a few constrictions as can be seen in several other fibers in this photomicrograph.

We have found that increasing the alkali concentration to about 7% or greater in the concentrated alkali extraction stage of our process brings about a definite change in the physical condition of the fibers so that they are more uniformly and readily responsive to purification and subsequent treating agents, as for example in the manufacture of viscose. Photomicrographs 2b and 2d represent sulfate soft wood pulps produced by the method of our invention, but with no concentrated caustic extraction and with extraction with a 6% NaOH solution respectively. The constrictions of the swollen secondary wall by portions of the primary wall are evident and a striking feature of these swollen fibers is the appearance of the inner portion of the secondary wall, or tertiary wall, next to the lumen. It seems to be almost totally unaffected by the swelling agent in many cases, except that it is twisted or spiraled as the main portion of the fibre swells. In photomicrograph 2b, where swelling is well advanced, it is seen that this wall persists even after the secondary wall has disintegrated.

Photomicrographs 2c and 2e represent fibers prepared according to the process of the present invention including extraction with 7% sodium hydroxide. A more general swelling of the fibers may be observed with less constriction by portions of the primary wall. Moreover, it is to be observed that as a unique and important feature of our invention, the tertiary wall, or the portion nearest the lumen, is now attacked by the swelling agent, along with the main portion of the secondary wall, and photomicrograph 2e shows how this inner wall is separating into spiraling fibrils.

In Figures 3a to 3b, the magnification has been doubled to demonstrate this effect more clearly. In photomicrograph 3a, prehydrolyzed sulfate softwood pulp without concentrated caustic extraction exhibits the persistence of the tertiary layer. In photomicrograph 3b, taken of fibres treated by the process of our invention, the tertiary layer is separating, along with the main portion of the secondary layer, into its finer constituents. By thus modifying the individual wood fibers so that they are better able to react uniformly and completely, and so that the fiber walls are affected substantially simultaneously by the swelling agent, the properties of the final derivative, e. g. viscose rayon tire cord, may be improved.

We have also unexpectedly found that in the concentrated caustic extraction step (step #7 in the outline above) there is a critical concentration of alkali at which the removal of pentosans and short chain cellulose portions becomes much more effective. The effect of the alkali concentration during the concentrated caustic extraction is clearly illustrated in Figure 4. A pulp was prepared from slash pine wood chips as described in the preceding paragraph. After the first four stages of the bleach process (chlorination, hot alkaline extraction, and sodium hypochlorite bleach) six portions were extracted for one hour at 86° F. with solution containing sodium hydroxide, sodium sulfide and sodium carbonate, in the ratio by weight of approximately 70:20:10 calculated as $Na_2O$, in which the effective alkalinity of the solutions, calculated as sodium hydroxide, varied from 3% to 13%. Following this extraction, each sample was given another hypochlorite bleach and an acid treatment before finally washing and drying. The data plotted in Figure 4 shows the effect on the beta and gamma (shorter chain) cellulose and the pentosan content of the final bleached pulp samples. The value of 0% effective alkali indicates the pentosan and beta and gamma cellulose content in the original pulp before the cold caustic treatment.

It is to be emphasized that the purification is a result of a series of treatments: prehydrolysis, pulping, and multistage bleaching, each of which must be carried out under the proper conditions and in the proper order to obtain the optimum effect. The caustic extraction of an alkaline cooked woodpulp is not nearly as effective in reducing pentosan content, for example, in a pulp which has not been given a prehydrolysis treatment as in one which has. This is shown by the following data obtained on pulp derived from wood chips which were cooked by the sulfate process and given an extraction with 6% sodium hydroxide solution as hereinbefore mentioned.

|  | Alpha Cellulose, percent | Pentosans, percent |
|---|---|---|
| 1. Black spruce: |  |  |
| No prehydrolysis | 91.0 | 4.30 |
| Acid prehydrolysis | 96.3 | 1.35 |
| 2. Jack pine: |  |  |
| No prehydrolysis | 91.7 | 5.5 |
| Acid prehydrolysis | 96.0 | 1.2 |

It is also to be pointed out that with wood pulp prepared by an acid pulping (sulfite) process, it is necessary to follow a purification procedure different from that herein described in order to effectively remove the short chain cellulose and pentosan constituents.

As an example of the unusual improvement in tire cord pulp quality which is obtained by utilizing the process of the present invention, data are listed in Table III for two slash pine wood pulps prepared by the general procedure outlined above. For pulp A, a caustic solution of approximately 6% sodium hydroxide was used in the extraction stage. For pulp B, the caustic concentration was increased to approximately 7% sodium hydroxide. Both pulps were used to produce viscose tire cord grade yarn which was converted to tire cord. The fatigue resistance of the tire cords was then measured on the DB fatigue tester.

TABLE III

*Pulp properties and tire cord fatigue resistance*

| Pulp | Alpha Cellulose, percent | Beta Cellulose, percent | Gamma Cellulose, percent | Pentosans, percent | Fatigue Resistance on DB Tester, minutes |
|---|---|---|---|---|---|
| A | 95.2 | 3.1 | 2.1 | 1.5 | 41 |
| B | 96.7 | 1.9 | 1.4 | 0.6 | 90 |

Pulp A is comparable in analytical characteristics to commercial dissolving woodpulp for tire cord manufacture made by the sulfite process and its fatigue resistance in tire cord is in the range which would be expected from such a pulp. In pulp B, a substantial additional removal of pentosans and low chain length cellulose has been effected and a material has been obtained, which upon conversion into viscose tire cord exhibits a fatigue resistance which is at an entirely new level, and, in fact, closely approaches the fatigue resistance of tire cord derived from purified cotton linters.

It will be appreciated that in other characteristics, such as percent elongation and tenacity, the tire cord produced in accordance with our process is fully the equivalent of any commercially available viscose grade tire cord.

Additional data, presented in Table IV, refer to a group of 9 wood pulps in which the pentosan and short chain cellulose content has been reduced by treatment with 7% alkali, as hereinbefore described, compared with a group of 8 wood pulps in which these components have been left at a higher average value because of treatment with alkali of lesser concentration. Fatigue resistance of the tire cords, as measured by the DB fatigue tester previously referred to, demonstrates the general correlation of tire cord fatigue with these pulp properties.

TABLE IV

*Wood pulp properties and tire cord fatigue resistance*

|  | Alpha Cellulose, Percent | Beta Cellulose, Percent | Gamma Cellulose, Percent | Pentosans, Percent | DB Fatigue Resistance, mins. |
|---|---|---|---|---|---|
| Group 1 Average (9 pulps) | 97.1 | 1.7 | 1.3 | 0.9 | 73 |
| Range | 95.7–97.9 | 1.1–2.8 | 0.9–1.8 | 0.5–1.4 | 65–90 |
| Group 2 Average (8 pulps) | 95.2 | 2.8 | 2.1 | 1.6 | 41 |
| Range | 94.0–96.4 | 1.6–3.7 | 1.8–2.4 | 0.9–2.2 | 31–51 |

Although there may be some overlapping in the analytical properties of various of the pulps from the two groups, in general, the pulps which produced tire cord with better fatigue resistance had higher alpha cellulose, lower beta and gamma cellulose, and lower pentosan content.

The modifications which the purified pulp undergoes in the first steps of the manufacture of viscose are also of interest. As hereinbefore pointed out, after steeping the material in strong caustic solution, usually in the range of 17.5 to 18.5% sodium hydroxide, to form alkali cellulose, it is pressed to a specified solid to liquid ratio, shredded into crumbs, and then allowed to age. The principal object of the aging step is to reduce the cellulose viscosity by an alkaline oxidative process of chain length reduction.

In a series of tests involving the preparation of viscose from cotton linters pulp and several wood pulps, at various times during the aging step, samples of alkali cellulose were removed, the soluble portion was washed out with water, and the beta and gamma cellulose of the filtrate determined. At the same time, the alkali cellulose was xanthated and converted to viscose. The gamma cellulose content of the alkali cellulose during the aging process showed a correlation with tire cord fatigue resistance, and the results which were obtained with the various pulps are represented graphically in Figure 5. The gamma cellulose value in percent is plotted against the viscose vicosity in poises. As the viscosity decreases during aging, the amount of gamma cellulose increases. Pine woodpulp produced by the procedure of the present invention but with an alkaline extraction liquor of 6% active alkali concentration, calculated as sodium hydroxide, gave an alkali cellulose with a higher gamma cellulose content and a tire cord with fatigue resistance no better than present commercially available sulfite viscose grade wood pulp. By extracting the pulp during the bleaching and purification process with a 7% active alkali solution, calculated as sodium hydroxide, the gamma cellulose content of the alkali cellulose during aging was substantially the same as that of cotton linters and the fatigue resistance of the eventual tire cord was excellent. The values given for the DB fatigue resistance in Figure 5 were obtained in each instance with a viscose viscosity of about 25 poises.

Although this improved resistance to fatigue, which we have found is obtained by the process of our invention, is of particular value in viscose tire cord, it is to be appreciated that this characteristic would undoubtedly also be beneficial in other applications such as, for example, in textile yarns, viscose films, filter fabrics, upholstery, umbrella fabrics, high pressure hose and camera bellows. Also, the highly purified fiber of our invention may be utilized in various plastics wherein the cellulose is in the form of the ether (e. g. methyl or ethyl cellulose) or for any other use wherein viscose rayon normally finds application.

In the following examples, and wherever they appear herein, the values for alpha, beta and gamma cellulose were determined as follows:

Alpha cellulose is determined gravimetrically, according to TAPPI Standard Method T–203m. This was adapted from the tentative standard method IV of the American Chemical Society (Ind. Eng. Chem., Analy. Ed. 1: 54, Jan. 15, 1929).

Beta and gamma cellulose are determined volumetrically, by a procedure based on the method of the National Bureau of Standards (Launer, "Simplified Volumetric Determination of Alpha, Beta and Gamma Cellulose in Pulps and Papers." J. Research Natl. Bur. Standards 18: 333, March 1937). The filtrate from the alpha cellulose determination is divided into two equal portions. An aliquot from one portion is oxidized with standard ferrous ammonium sulfate solution. This is calculated as beta plus gamma cellulose. The second portion of the alpha cellulose filtrate is neutralized, using a slight excess of 6 N sulfuric acid, allowed to stand until the precipitate of beta cellulose has settled and the supernatant liquid is clear. An aliquot of the supernatant liquid is then removed and oxidized with standard bichromate solution in the same way. This is calculated as gamma cellulose. Beta cellulose is calculated from the difference between the beta plus gamma and the gamma determinations.

Gamma cellulose is considered to comprise molecular chain lengths up to 10 or 12 glucose anhydride units, beta cellulose up to 40 or 50, and alpha cellulose the higher molecular chain lengths.

Also, all pentosan determinations appearing in the numbered tables and the examples were made according to the method of Smith and Rogers, presented at the 37th Annual Meeting of the Technical Association of the Pulp and Paper Industry at New York on February 21, 1952, and published in Analytical Chemistry 25, No. 6, pages 931–33 (June 1953).

*Example 1.*—Chips prepared from slash pine pulp wood were treated in a rotating digester with four times their dry weight of water (including the moisture content of the chips) and heated with direct steam to 343° F. (approximately 110 pounds per square inch gauge pressure) in 35 minutes. The pressure was maintained at this figure for 30 minutes longer and then relieved; the liquid was drained off, and the chips were washed with hot water. A sulfate cooking liquor containing sodium hydroxide, sodium sulfide and sodium carbonate in the ratio, calculated as $Na_2O$, of 7:2:1 was added in such quantity as to provide a total $Na_2O$ content of 17.5% based on the dry weight of chips, and a total liquid to chip ratio of 4.5:1. The mixture was heated to 343° F. (approximately 110 pounds per square inch gauge pressure) in two hours and maintained at this maximum temperature for two hours. The pressure was then relieved and the pulp was blown from the digester. (If desired, instead of a rotating or tumbling digester, a stationary digester with recirculation of the liquors may be used with comparable results.) After washing and screening, the pulp was given the following multistage bleaching and purification treatment.

1. First chlorination:
    Consistency_____ 2.5%.
    pH_____ 2.0.
    Available chlorine_____ 0.1 gram/liter residual.
    Temperature_____ 77° F.
    Time_____ 1 hour.
    Wash.

2. Second chlorination: (Same conditions as for first chlorination).
   Wash.

3. Hot alkaline extraction:
   Consistency____ 10%.
   Chemicals_____ 3% NaOH on weight of pulp.
   Temperature___ 158° F.
   Time_____ 1 hour.
   Wash.

4. Hypochlorite bleach:
   Consistency_____ 2.5%.
   Chemicals_____ 0.45 gram/liter available chlorine maintained.
   0.24 gram/liter alkalinity.
   Temperature_____ 122° F.
   Time_____ 3 hours.
   Wash.

5. Alkaline purification:
   Consistency_____ 10%.
   Chemicals_____ 7% NaOH solution.
   Temperature_____ 77° F.
   Time_____ 1 hour.
   Wash.

6. Sour:
   Consistency___ 2.5%.
   Chemicals_____ 1% H$_2$SO$_4$ on dry weight of pulp.
   Temperature___ 77° F.
   Time_____ 30 minutes.
   Wash with soft water.

The pulp produced in accordance with the above process had the following analytical characteristics:

Alpha cellulose_____percent__ 96.7
Beta cellulose_____do____ 1.9
Gamma cellulose_____do____ 1.4
Soda soluble_____do____ 6.4
Pentosans _____do____ 0.3
Chloroform extractable_____do____ 0.04
Ash _____do____ 0.09
2.5 grams cuprammonium, viscosity_____sec__ [1] 4

[1] 88 centipoises.

When converted into tire cord, it showed a fatigue resistance on the DB tester of 90 minutes.

*Example 2.*—Chips prepared from black gum pulpwood were treated in a stationary digester with three times their dry weight of water (including the moisture content of the chips) and heated indirectly by circulating the liquor through a heat exchanger to 343° F. approximately 110 pounds per square inch gauge pressure) in 30 minutes. After maintaining this temperature for an additional 30 minutes, the pressure was relieved and the liquid drained off.

The prehydrolyzed chips were digested with a sulfate liquor under the following conditions.

Liquid to wood ratio_____ 5:1
Ratio of chemicals as Na$_2$O:
   NaOH:Na$_2$S:Na$_2$CO$_3$ _____ 6:3:1
Total alkalinity as Na$_2$O based on dry weight of chips_____percent__ 15
Time to reach 343° F. (indirect heating with circulation) _____hours__ 2
Time at 343° F_____do____ .2

At the end of the pulping period, the pulp was blown from the digester and subsequently washed and screened. The bleaching and purification procedure was essentially the same as described in Example 1 except that only a single stage chlorination was used.

This pulp had the following analytical characteristics:

Alpha cellulose_____percent__ 97.9
Beta cellulose_____do____ 1.1
Gamma cellulose_____do____ 1.1
Soda soluble_____do____ 6.2
Pentosans _____do____ 1.4
Chloroform extractable_____do____ 0.06
Ash _____do____ 0.11
2.5 grams cuprammonium, viscosity_____sec__ [1] 5

[1] 110 centipoises.

When converted into tire cord, it showed a fatigue resistance on the DB tester of 66 minutes.

*Example 3.*—Chips prepared from slash pine pulpwood were treated in a rotating digester with five times their dry weight of water (including the moisture content of the chips). The temperature was increased to 343° F. in 30 minutes, with direct steam, and maintained at this temperature (approximately 110 pounds per square inch gauge pressure) for another 30 minutes. The pressure was relieved, the liquid drained off, and the chips washed with three times their dry weight of water at 175° F.

The prehydrolyzed chips were digested with a "soda" liquor under the following conditions.

Liquid to wood ratio_____ 5:1
Ratio of chemicals, as Na$_2$O:NaOH:Na$_2$CO$_3$_____ 9:1
Total alkalinity, as Na$_2$O based on dry weight of chips_____percent__ 22.5
Time to reach 343° F_____hours____ 2
Time at 343° F_____do____ 2

At the end of the pulping period the pulp was blown from the digester and, subsequently washed and screened. The bleaching and purification procedure was essentially the same as described in Example 1, except that an additional hot alkaline extraction stage using the same conditions as stage 3, was inserted between the two chlorinations (stages 1 and 2).

This pulp had the following analytical characteristics:

Alpha cellulose_____percent__ 97.2
Beta cellulose_____do____ 1.4
Gamma cellulose_____do____ 1.4
Soda soluble_____do____ 6.4
Pentosans _____do____ 0.6
Chloroform extractable_____do____ 0.04
Ash _____do____ 0.11
2.5 grams cuprammonium, viscosity_____sec__ [1] 3

[1] 66 centipoises.

When converted into tire cord, it showed a fatigue resistance on the DB tester of 74 minutes.

*Example 4.*—An unbleached woodpulp, prepared as in Example 1 was given a multistage bleaching and purification treatment as follows.

1. First chlorination:
   Available chlorine_____ 0.1 gram/liter residual.
   Consistency _____ 3.0%.
   pH _____ 2.0.
   Temperature _____ 75° F.
   Time _____ 30 minutes.
   Wash.

2. Second chlorination: (Same conditions as for first chlorination).
   Wash.

3. Hot alkaline extraction:
   Consistency _____ 13.0%.
   Chemicals _____ 3% NaOH on dry wt. of pulp.
   Temperature _____ 160° F.
   Time _____ 1 hour.
   Wash.

4. Hypochlorite bleach:
- Consistency — 12%.
- Chemicals — 0.40 gram/liter available chlorine maintained. 0.25 gram/liter alkalinity.
- Temperature — 120° F.
- Time — 2 hours, 45 minutes.

Wash.

5. Alkaline purification:
- Consistency — 10%.
- Chemicals—
  NaOH:Na$_2$S:Na$_2$CO$_3$ in ratio, as Na$_2$O 7:2:1 — 7.0% active alkali calculated as NaOH.
- Temperature — 75° F.
- Time — 1 hour.

Wash.

6. Second hypochlorite bleach:
- Consistency — 6%.
- Chemicals — 0.34 gram/liter available chlorine maintained. 0.30 gram/liter alkalinity.
- Temperature — 95° F.
- Time — 2 hours.

Wash.

7. Sour:
- Consistency — 2.5%.
- Chemicals — 1% H$_2$SO$_4$ on dry wt. of wood.
- Temperature — 70° F.
- Time — 30 minutes.

Wash with soft water.

This pulp had the following analytical characteristics:

| | |
|---|---|
| Alpha cellulose percent | 96.4 |
| Beta cellulose do | 2.3 |
| Gamma cellulose do | 1.3 |
| Soda soluble do | 8.5 |
| Pentosans do | 0.3 |
| Chloroform extractable do | 0.04 |
| Ash do | 0.12 |
| 2.5 grams cuprammonium, viscosity sec | ¹ 5 |

¹ 110 centipoises.

When converted into tire cord, it showed a fatigue resistance on the DB tester of 70 minutes.

It will be understood that the foregoing examples are illustrative only and that the invention is not limited by the details thereof but only by the appended claims.

Having thus described our invention, we claim:

1. The process of treating wood to produce a purified, substantially unhydrated, cellulose fiber, the individual fibers of which are characterized by a marked amount of chemical fibrillation in the presence of swelling agents, as determinable by microscopic inspection, and by the substantially simultaneous response of the primary, secondary and tertiary portions of the fiber wall to the said swelling agents, whereby the said fibers are rendered more readily dispersible in chemical media for conversion into cellulose derivatives, which comprises (1) subjecting the wood to hydrolysis at a temperature in the range from 300° to 350° F. and at a pressure greater than atmospheric for from about 30 to 120 minutes, said hydrolysis being carried out at least in part under acid conditions equivalent to up to about .3% solution of acid, removing the excess liquid and washing the remaining solid material, (2) digesting the hydrolyzed wood at a temperature from about 325° to 350° F. in an alkaline medium having a total alkalinity of from 15% to 25% of the dry weight of the material, calculated as Na$_2$O to form a pulp, said alkaline medium comprising sodium hydroxide and sodium sulfide, the percentage (by weight) of sodium sulfide to the sum of sodium sulfide and sodium hydroxide being in the range 20% to 30%, and draining, washing and screening the pulp, (3) treating the pulp with a delignifying amount of elemental chlorine at a pH between 1.75 and 2.5 and a temperature of from 68° to 86° F. for a time sufficient to consume substantially all the chlorine added and then washing the chlorinated pulp, (4) contacting the chlorinated pulp with an alkaline agent having a concentration of from 1% to 5% based on the dry weight of the pulp at a temperature in the range from 160° to 230° F. for from about 30 to 120 minutes and sufficient to remove the alkaline soluble impurities and washing the pulp, (5) bleaching the pulp with sodium hypochlorite solution at a pH of at least 8 and up to about 12, at a temperature of from 85° to 140° F., the said hypochlorite solution being of a concentration sufficient to essentially decolorize the pulp but insufficient to cause substantial degradation of the cellulose, and then washing the pulp, (6) subjecting the pulp to a purification treatment with an alkaline solution containing at least 7% and up to 12% effective alkali, calculated as sodium hydroxide, at a temperature of from 68° to 120° F. for up to about 2 hours and draining and washing the pulp, (7) bleaching the pulp with an oxidizing agent selected from the group consisting of sodium hypochlorite and chlorine dioxide at a pH in the range from 8 to 12, and at a temperature from about 85° to 140° F., the concentration of the said oxidizing agent and the time of treatment being determined by the pulp viscosity desired, and washing the bleached pulp, (8) soaking the bleached pulp in a dilute solution of a mineral acid containing about 1% acid based on the dry weight of the pulp, at a temperature from about 68° to 86° F. for about 15 to 60 minutes, and (9) washing the pulp with soft water.

2. The process of treating wood to produce a purified, substantially unhydrated, cellulose fiber, the individual fibers of which are characterized by a marked amount of chemical fibrillation in the presence of swelling agents, as determinable by microscopic inspection, and by the substantially simultaneous response of the primary, secondary and tertiary portions of the fiber wall to the said swelling agents, whereby the said fibers are rendered more readily dispersible in chemical media for conversion into cellulose derivatives, which comprises (1) subjecting the wood to hydrolysis at an elevated temperature and at a pressure greater than atmospheric for from about 30 to 120 minutes, said hydrolysis being carried out at least in part under acid conditions equivalent to up to about .3% solution of acid, and removing the excess liquid, (2) digesting the hydrolyzed wood at an elevated temperature in an alkaline medium having a total alkalinity of from 15% to 25% of the dry weight of the material, calculated as Na$_2$O to form a pulp, said alkaline medium comprising sodium hydroxide and sodium sulfide, the percentage (by weight) of sodium sulfide to the sum of sodium sulfide and sodium hydroxide being in the range 20% to 30%, and draining, washing and screening the pulp, (3) treating the pulp with a delignifying amount of elemental chlorine at a pH between 1.75 and 2.5 and a temperature of from 68° to 86° F. for a time sufficient to consume substantially all the chlorine added and then washing the chlorinated pulp, (4) contacting the chlorinated pulp with an alkaline agent having a concentration of from 1% to 5% based on the dry weight of the pulp at a temperature in the range from 160° to 230° F. for from about 30 to 120 minutes and sufficient to remove the alkaline soluble impurities and washing the pulp, (5) bleaching the pulp with sodium hypochlorite solution at a pH of at least 8 and up to about 12, at a temperature of from 85° to 140° F., the said hypochlorite solution being of a concentration sufficient to essentially decolorize the pulp but insufficient to cause substantial degradation of the cellulose, and then washing the pulp, (6) subjecting the pulp to a purification treatment with an alkaline solution containing at least 7% and up to 12% effective alkali, calculated as sodium hydroxide, at a temperature of from 68° to 120° F. for up to about 2 hours and draining and washing the pulp, (7) soaking the pulp in a dilute solution of a mineral acid containing about 1% acid based on the dry weight of the pulp, at a temperature from about 68° to 86° F. for about 15 to 60 minutes, and (8) washing the pulp with soft water.

3. The pulp produced by the process of claim 2.

References Cited in the file of this patent

UNITED STATES PATENTS

| | | |
|---|---|---|
| 1,838,326 | Richter | Dec. 29, 1931 |
| 1,923,292 | Bassett | Aug. 22, 1933 |
| 2,065,395 | Richter | Dec. 22, 1936 |
| 2,482,858 | Martin et al. | Sept. 27, 1949 |

FOREIGN PATENTS

| | | |
|---|---|---|
| 594,835 | Great Britain | Nov. 20, 1947 |

OTHER REFERENCES

Richter: Ind. & Eng. Chem. 23, 138 and 139 (1931).
Aronovsky et al.: Paper Ind. and Paper World, June 1939, pp. 336–343.
Chilson Tech. Assn. Papers, vol. XXIII, p. 660 (1940).
Casey: Pulp and Paper, volume I, published by Interscience Publishers, N. Y., 1952, chapter V, Bleaching, pages 248–291, and pages 310–321.